United States Patent
Munsell et al.

(10) Patent No.: US 8,619,822 B2
(45) Date of Patent: Dec. 31, 2013

(54) METHOD AND SYSTEM FOR GENERATING UPLINK SIGNALS FROM A GROUND SEGMENT

(75) Inventors: Michael R. Munsell, Playa del Rey, CA (US); Hanno Basse, Santa Monica, CA (US); Daniel M. Miner, Santa Clara, CA (US); Mitchell B. Wasden, Redondo Beach, CA (US)

(73) Assignee: The DIRECTV Group, Inc., El Segundo, CA (US)

( * ) Notice: Subject to any disclaimer, the term of this patent is extended or adjusted under 35 U.S.C. 154(b) by 1115 days.

(21) Appl. No.: 11/728,378

(22) Filed: Mar. 26, 2007

(65) Prior Publication Data

US 2008/0240258 A1  Oct. 2, 2008

(51) Int. Cl.
*H04J 3/04* (2006.01)
(52) U.S. Cl.
USPC ........... 370/535; 370/241; 370/252; 370/498; 725/90; 725/91; 725/92; 725/93; 725/94; 725/95; 725/96; 725/97; 725/98; 725/99; 725/100; 725/101; 725/102; 725/103; 725/104; 725/105; 725/106; 725/107; 725/108; 725/109; 725/110

(58) Field of Classification Search
USPC ............. 370/241, 252, 498, 535; 725/90–110
See application file for complete search history.

(56) References Cited

U.S. PATENT DOCUMENTS

| | | | |
|---|---|---|---|
| 5,566,353 A | 10/1996 | Cho et al. | |
| 5,570,126 A | 10/1996 | Blahut et al. | |
| 5,826,102 A | 10/1998 | Escobar et al. | |
| 5,926,547 A | 7/1999 | Heieis et al. | |
| 6,397,039 B1 | 5/2002 | Butte et al. | |
| 6,449,768 B1 | 9/2002 | Oftedahl et al. | |
| 6,462,684 B1 | 10/2002 | Medelius et al. | |
| 6,507,672 B1 | 1/2003 | Watkins et al. | |
| 6,525,780 B1 | 2/2003 | Bruno et al. | |
| 6,732,370 B1 * | 5/2004 | Gordon et al. | 725/39 |
| 6,868,121 B2 * | 3/2005 | Miyazawa | 375/240.07 |
| 7,039,048 B1 * | 5/2006 | Monta et al. | 370/389 |
| 7,444,659 B2 | 10/2008 | Lemmons | |
| 7,634,788 B2 | 12/2009 | Gordon et al. | |
| 7,636,929 B2 | 12/2009 | Park | |
| 2002/0069107 A1 | 6/2002 | Werner | |
| 2002/0100054 A1 | 7/2002 | Feinberg et al. | |
| 2002/0174438 A1 | 11/2002 | Cleary et al. | |
| 2002/0178278 A1 | 11/2002 | Ducharme | |

(Continued)

FOREIGN PATENT DOCUMENTS

EP    1414246 A2 *  4/2004  ............. H04N 7/173

OTHER PUBLICATIONS

Non-final Office action dated Dec. 21, 2010 in U.S. Appl. No. 11/728,394, filed Mar. 26, 2007 by Michael R. Munsell et al.

*Primary Examiner* — Hassan Phillips
*Assistant Examiner* — Gautam Sharma (57) ABSTRACT

A system and method of generating an output signal includes a receiving system generating a plurality of signals having a first format, an encoder 162 encoding the plurality of signals into a plurality of transport streams and a multiplexer 210. The system also includes a local area network 130 routing the plurality of transport streams to the multiplexer 210 to form a combined signal, a modulator 214 modulating the combined signal to form a modulated signal and a system 202 forming the output signal from the modulated signal. In one aspect, the output signals may be satellite uplink signals.

43 Claims, 9 Drawing Sheets

(56) References Cited

U.S. PATENT DOCUMENTS

| | | |
|---|---|---|
| 2003/0025832 A1 | 2/2003 | Swart et al. |
| 2003/0028890 A1* | 2/2003 | Swart et al. .................... 725/91 |
| 2003/0192061 A1* | 10/2003 | Hwangbo et al. ............. 725/138 |
| 2003/0200548 A1 | 10/2003 | Baran et al. |
| 2004/0010807 A1* | 1/2004 | Urdang et al. ................ 725/136 |
| 2004/0128682 A1 | 7/2004 | Liga et al. |
| 2004/0244036 A1* | 12/2004 | Wright ............................ 725/32 |
| 2005/0060754 A1 | 3/2005 | Simyon |
| 2005/0155079 A1* | 7/2005 | Chen et al. .................... 725/115 |
| 2007/0050834 A1 | 3/2007 | Royo et al. |
| 2008/0222689 A1* | 9/2008 | Howcroft et al. ............. 725/110 |

* cited by examiner

METHOD AND SYSTEM FOR GENERATING UPLINK SIGNALS FROM A GROUND SEGMENT

CROSS-REFERENCES TO RELATED APPLICATIONS

This application is related to Utility applications Ser. No. 11/728,552 entitled "Method and System for Marking Video Signals for Identification"; Ser. No. 11/728,501 entitled "Method and System for Inserting Digital Video Effects Into a Video Stream Using a Bypass Router"; Ser. No. 11/728,395 entitled "Method and System for Inserting Digital Video Effects Into a Video Stream After Bypass Routing and Before Encoding"; Ser. No. 11/728,379 entitled "Method and System for Inserting Digital Video Effects into a Video Stream in Redundant Paths Before Routing"; and Ser. No. 11/728,394 entitled "Method and System for Inserting Digital Video Effects Into a Video Stream at a Multiplexing Device After Routing", filed simultaneously herewith. The disclosures of the above applications are incorporated by reference herein.

TECHNICAL FIELD

The present disclosure relates generally to communication systems, and more particularly to a method and apparatus for forming output signals such as uplink signals in a satellite communication system.

BACKGROUND

The statements in this section merely provide background information related to the present disclosure and may not constitute prior art.

Satellite broadcasting of television signals has increased in popularity. Satellite television providers continually offer more and unique services to their subscribers to enhance the viewing experience. Providing reliability in a satellite broadcasting system is therefore an important goal of satellite broadcast providers.

High definition television offerings by major networks is continually increasing. Providing increasing high definition television programming to satellite television subscribers is desirable. However, this must be performed in a reliable manner.

SUMMARY

In one aspect of the invention, a method of forming an output signal includes receiving a plurality of signals having a first format, encoding the plurality of signals into a plurality of transport streams, after encoding, routing the plurality of transport streams through a local area network to a multiplexer to form a combined signal, modulating the combined signal to form a modulated signal, and forming the output signal from the modulated signal.

In a further aspect of the invention, an apparatus for generating an output signal includes a receiving system generating a plurality of signals having a first format, an encoder encoding the plurality of signals into a plurality of transport streams and a multiplexer. The system also includes a local area network routing the plurality of transport streams to the multiplexer to form a combined signal, a modulator modulating the combined signal to form a modulated signal and a system forming the output signal from the modulated signal.

One advantage of the invention is that input signals may be reliably processed and routed. Another advantage is the use of a local area network for routing.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

As used herein, the term module, circuit and/or device refers to an Application Specific Integrated Circuit (ASIC), an electronic circuit, a processor (shared, dedicated, or group) and memory that execute one or more software or firmware programs, a combinational logic circuit, and/or other suitable components that provide the described functionality. As used herein, the phrase at least one of A, B, and C should be construed to mean a logical (A or B or C), using a non-exclusive logical or. It should be understood that steps within a method may be executed in different order without altering the principles of the present disclosure.

The present disclosure is described with respect to a satellite television system. However, the present disclosure may have various uses including satellite transmission and data transmission and reception for home or business uses. The system may also be used in a cable system or wireless terrestrial communication system for generating an output signal.

Figure 1:
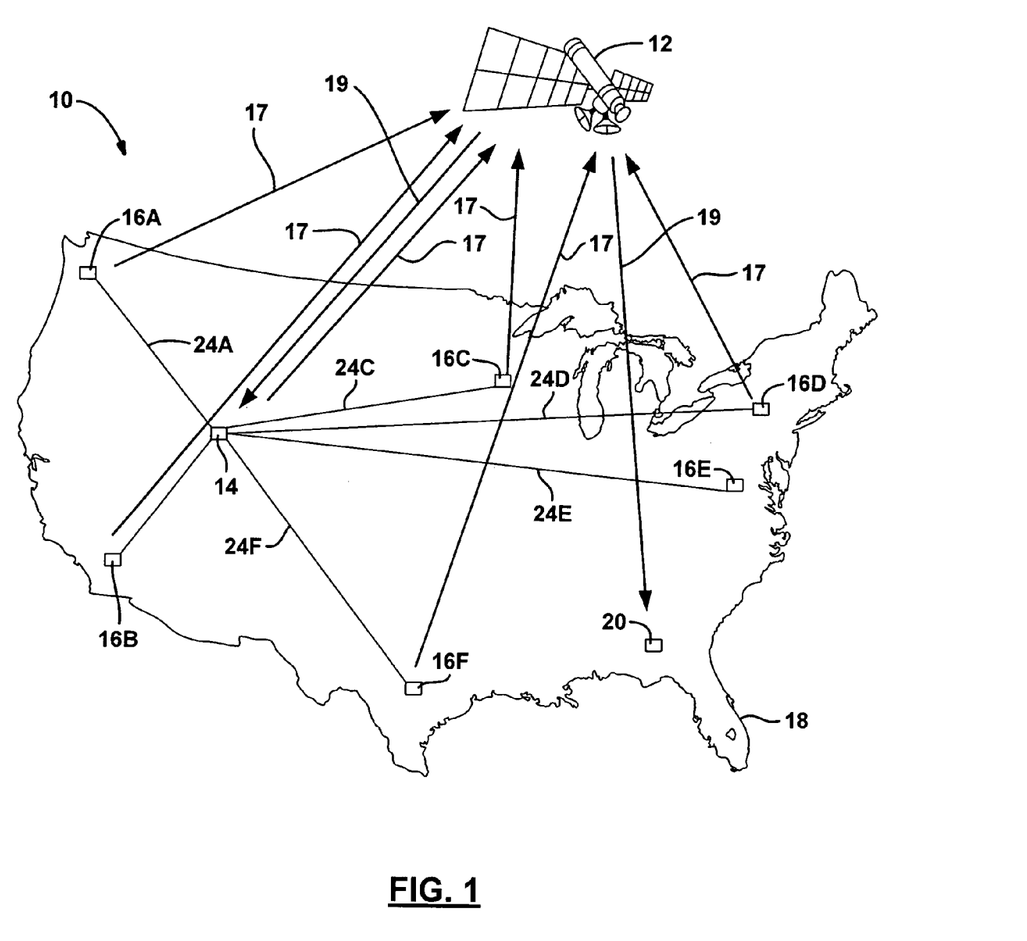
FIG. 1 is an overall system view of a satellite communication system in the continental United States.

Referring now to FIG. 1, a communication system 10 includes a satellite 12. The communication system 10 includes a central facility 14 and a plurality of regional facilities 16A, 16B, 16C, 16D, 16E and 16F. Although only one satellite is shown, more than one is possible. The regional facilities 16A-16F may be located at various locations throughout a landmass 18 such as the continental United States, including more or less than those illustrated. The regional facilities 16A-16F uplink various uplink signals 17 to satellite 12. The satellites downlink downlink signals 19 to various users 20 that may be located in different areas of the landmass 18. The users 20 may be mobile or fixed users. The uplink signals 17 may be digital signals such as digital television signals or digital data signals. The digital television signals may be high definition television signals. Uplinking may be performed at various frequencies including Ka band. The present disclosure, however, is not limited to Ka band. However, Ka band is a suitable frequency example used throughout this disclosure. The central facility 14 may also receive downlink signals 19 corresponding to the uplink signals 17 from the various regional facilities and from itself for monitoring purposes. The central facility 14 may monitor the quality of all the signals broadcast from the system 10.

The central facility 14 may also be coupled to the regional facilities through a network such as a computer network having associated communication lines 24A-24F. Each communication line 24A-F is associated with a respective regional site 16. Communication lines 24A-24F are terrestrial-based lines. As will be further described below, all of the functions performed at the regional facilities may be controlled centrally at the central facility 14 as long as the associated communication line 24A-F is not interrupted. When a communication line 24A-F is interrupted, each regional site 16A-F may operate autonomously so that uplink signals may continually be provided to the satellite 12. Each of the regional and central facilities includes a transmitting and receiving antenna which is not shown for simplicity in FIG. 1.

Figure 2:
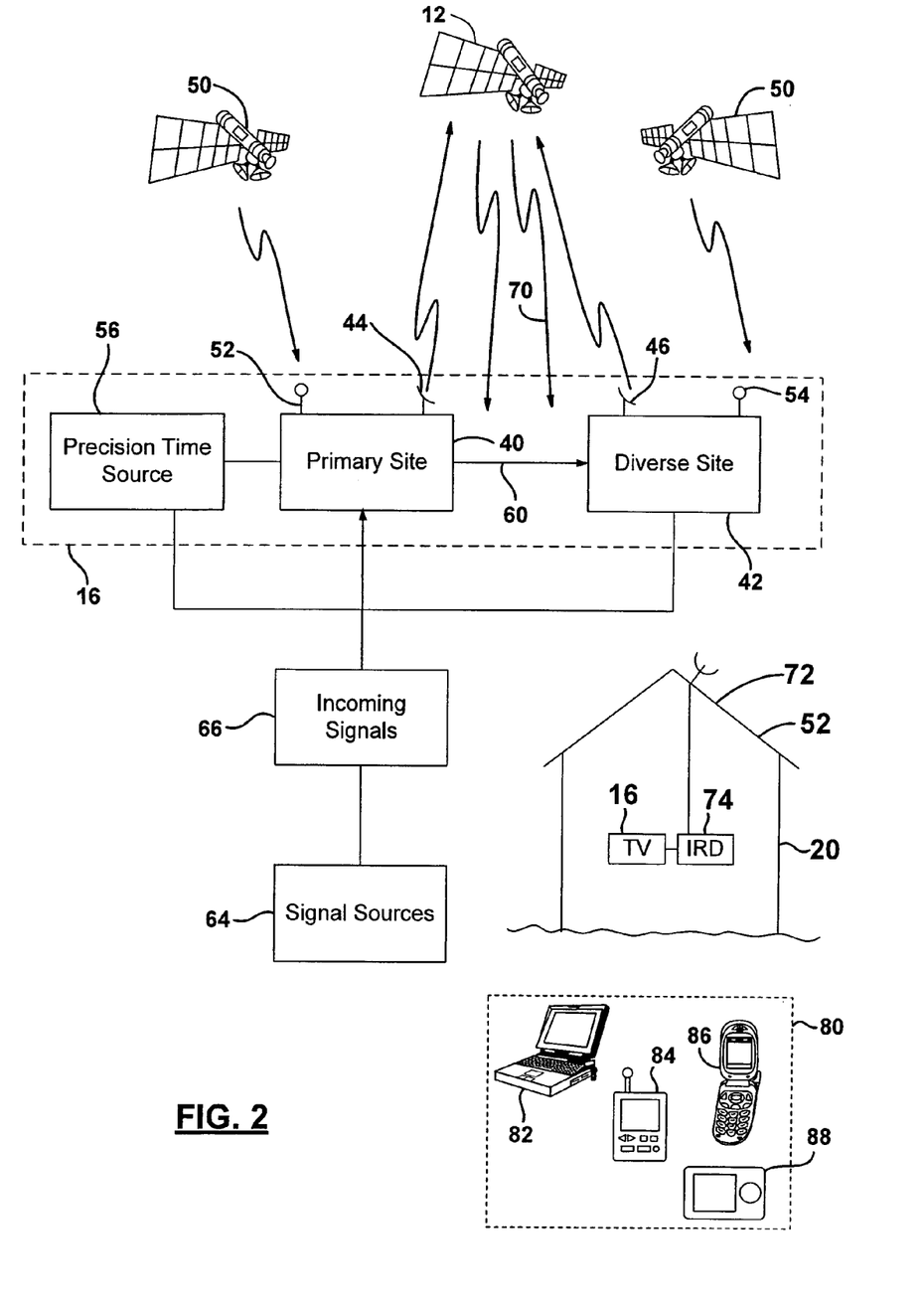
FIG. 2 is a system view at the regional level of a satellite system.

Referring now to FIG. 2, the regional facilities 16A-16F of FIG. 1 are illustrated collectively as reference numeral 16. The regional facilities 16 may actually comprise two facilities that include a primary site 40 and a diverse site 42. As will be described below, the central site 14 may also include a primary site and diverse site as is set forth herein. The primary site 40 and diverse site 42 of both the central and regional sites are preferably separated by at least 25 miles, or, more preferably, at least 40 miles. In one constructed embodiment, 50 miles was used. The primary site 40 includes a first antenna 44 for transmitting and receiving signals to and from satellite 12. Diverse site 42 also includes an antenna 46 for transmitting and receiving signals from satellite 12.

Primary site 40 and diverse site 42 may also receive signals from GPS satellites 50. GPS satellites 50 generate signals corresponding to the location and a precision timed signal that may be provided to the primary site 40 through an antenna 52 and to the diverse site 42 through an antenna 54. It should be noted that redundant GPS antennas (52A,B) for each site may be provided. In some configurations, antennas 44 and 46 may also be used to receive GPS signals.

A precision time source 56 may also be coupled to the primary site 40 and to the diverse site 42 for providing a precision time source. The precision time source 56 may include various sources such as coupling to a central atomic clock. The precision time source may be used to trigger certain events such as advertising insertions and the like.

The primary site 40 and the diverse site 42 may be coupled through a communication line 60. Communication line 60 may be a dedicated communication line. The primary site 40 and the diverse site 42 may communicate over the communication line using a video over internet protocol (IP).

Various signal sources 64 such as an optical fiber line, copper line or satellites may provide incoming signals 66 from the primary site 40 to the diverse site 42. Incoming signal 66, as mentioned above, may be television signals. The television signals may be high-definition signals. The incoming signals 66 such as the television signal may be routed from the primary site 40 through the communication line 60 to the diverse site 42 in the event of a switchover whether the switchover is manual or a weather-related automatic switchover. A manual switchover, for example, may be used during a maintenance condition.

In a terrestrial system, the satellites may be eliminated, used or replaced by transmission towers that use terrestrial antennas in place of antennas 46. In a cable system, the antennas 46 may be replaced with optical fibers or copper wires.

Users 20 receive downlink signals 70 corresponding to the television signals. Users 20 may include home-based systems or business-based systems. As illustrated, a user 20 has a receiving antenna 72 coupled to an integrated receiver decoder 74 that processes the signals and generates audio and video signals corresponding to the received downlink signal 70 for display on the television or monitor 76. It should also be noted that satellite radio systems may also be used in place of an IRD and TV for use of the satellite signals.

The user 20 may also be a mobile user. The user may therefore be implemented in a mobile device or portable device. The portable device 80 may include but are not limited to various types of devices such as a laptop computer 82, a personal digital assistant 84, a cellular telephone 86 or a portable media player 88.

Figure 3A:
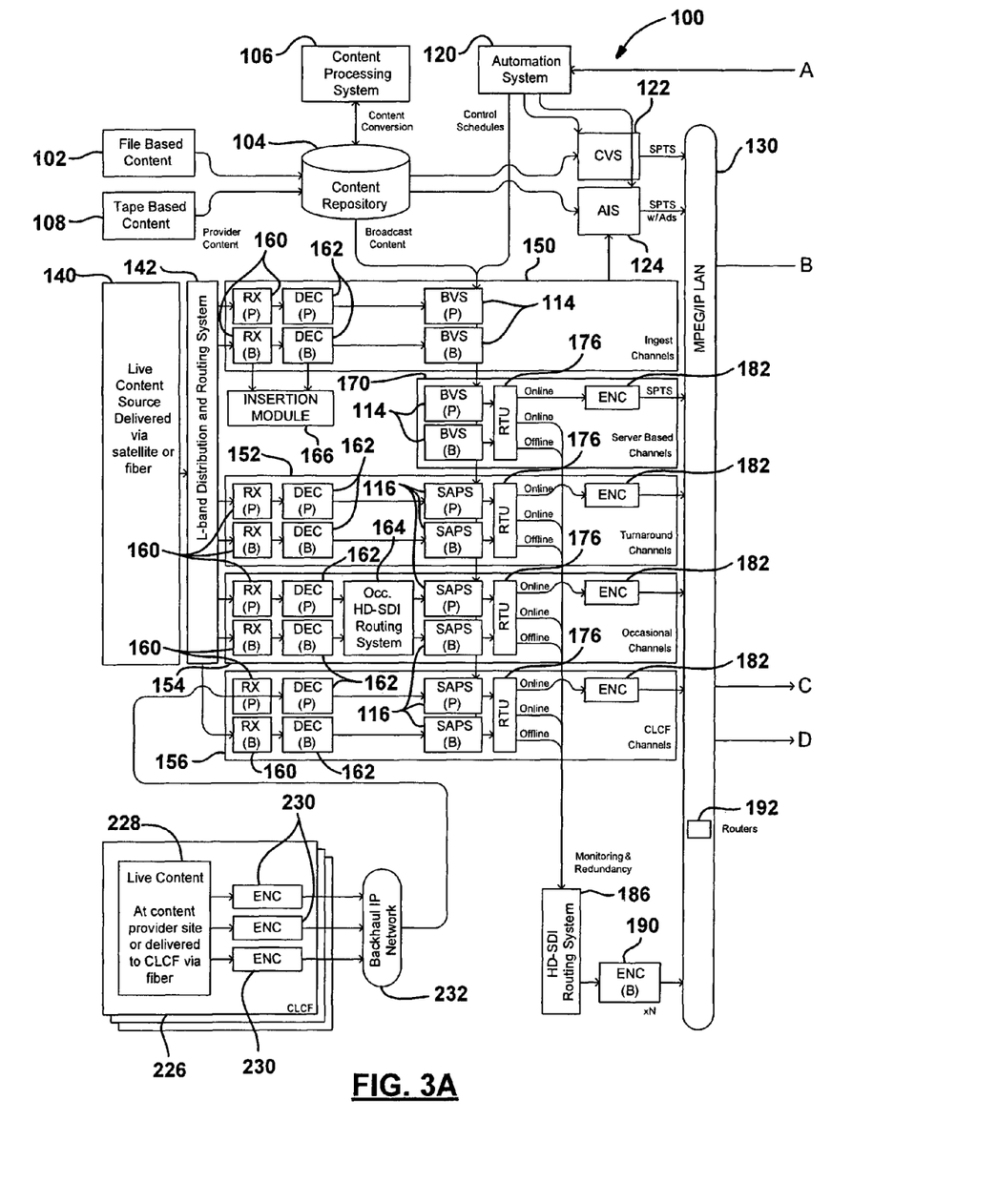
FIGS. 3A and 3B are a block schematic view of the system illustrated in FIGS. 1 and 2.
Figure 3B:
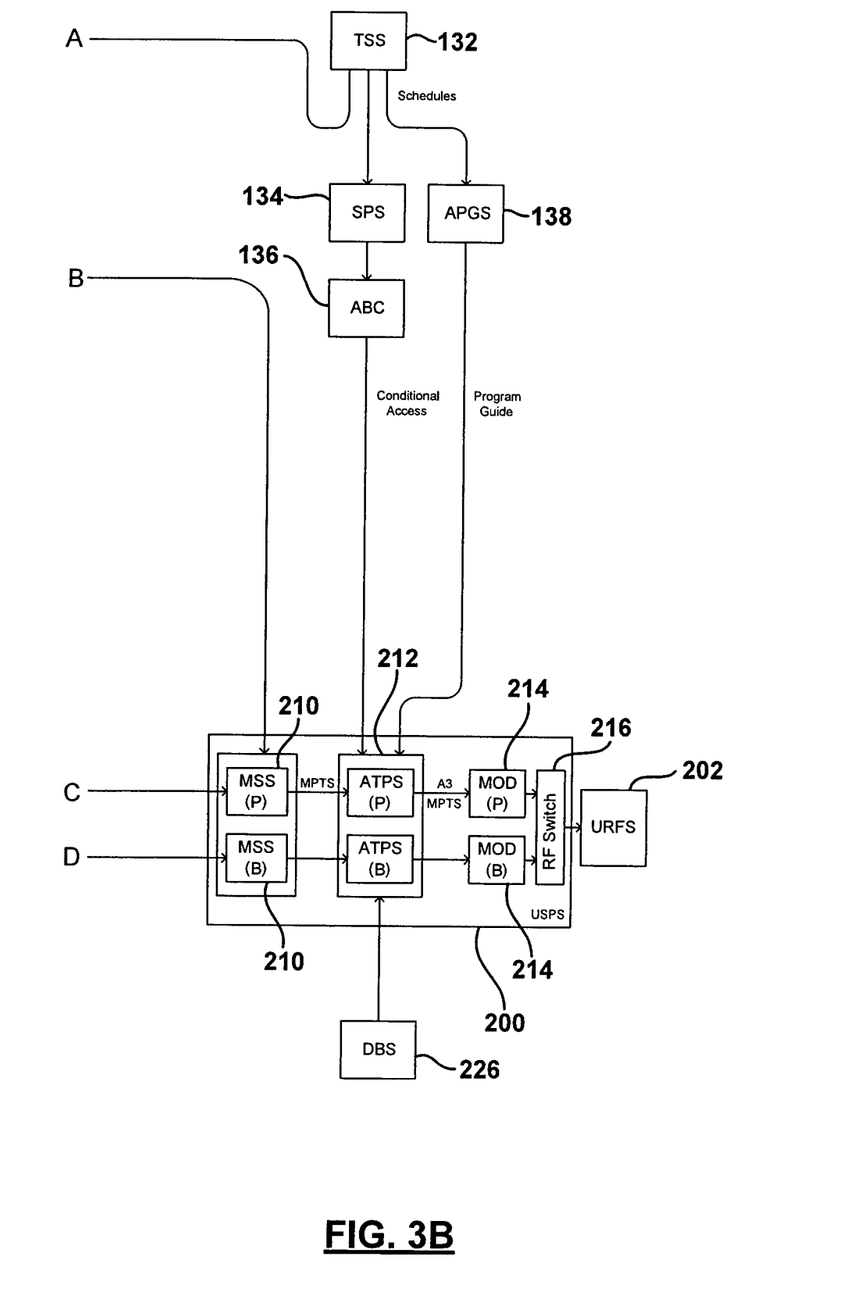

Referring now to FIGS. 3A and 3B, a ground segment system 100 for processing content and forming an output signal is illustrated. One method for providing content is using file-based content 102. The file-based content 102 may be in various standard formats such as CableLabs content, digital video disks or the like. The file-based content 102 is provided to a content repository 104 that stores the various file-based content. If needed, a content processing system 106 processes the content and converts the format of the file-based content. The content processing system may convert the video compression format, the resolution, the audio compression format and audio bit rates to match the target broadcast path. The content from the content repository 104 may be provided to various systems as will be described below. The content repository 104 may also receive tape-based content 108. The tape-based content 108 may be processed in the content processing system 106 into various formats including a first format such as high-definition, serial digital interface (HD-SDI) format. The content repository 104 may provide content to baseband video servers 114. The (P) and the (B) in the Figure denote a primary and secondary or back-up baseband video server. The content repository 104 may also provide signals to various service access processing systems 116. As illustrated, several service access processing systems (SAPS) are illustrated. Both primary and back-up service access processing systems 116 may be provided in the various chains. An automation system 120 may control the insertion of various advertising into file-based and live streams. The SAPS 116 may function as an advertising insertion module. The SAPS 116 may also include a digital video effects insertion module described below. The function of the automation system 120 will be further described below.

Content repository 104 may also be coupled to a compressed video server 122 and an ad-insertion server 124. The compressed video server 122 uses content that is retrieved from the content repository well in advance which may be stored therein. Likewise, ads may be also drawn from the content repository 104. Both the content video server 122 and ad-insertion server 124 provide content in a compressed manner. This is in contrast to the baseband video server 114 that is provided content in a baseband. The output of the content video server may be in an IP transport stream. The content output of the compressed video server 122 and the ad-insertion server 124 may be provided to a local area network 130.

A traffic scheduling system (TSS) 132 schedules the content throughout the ground segment 100. The traffic scheduling system 132 generates broadcast schedules utilized by the baseband video servers 114, the service access processing system 116, the automation system 120, the compressed video server 122 and the ad-insertion server 124. The traffic and scheduling system 132 provides program-associated data (PAD) to a scheduled pad server (SPS) 134. The SPS 134 delivers the program-associated data to an advanced broadcast controller (ABC) 136. As will be described below, an advanced broadcast management system illustrated in FIG. 4 may view and edit the program-associated data.

The traffic and scheduling system 132 may also be in communication with an advanced program guide system 138.

A live content source 40 delivered by way of a satellite optical fiber or copper wires couple live content to an L-band distribution and routing system 142. Of course, those skilled in the art will recognize various other frequencies may be used for the L-band. The output of the routing system 142 may be provided to ingest channels 150, turnaround channels 152, occasional channels 154, and continental United States local collection facility channels 156. Each of the various channels 150-156 may represent a number of channels. Each of the channels has primary and secondary or back-up electronics for processing the data stream.

The output of the L-band distribution and routing system 142 provide signals to receivers 160. As mentioned above, the paths may be in primary or secondary paths. The receivers 160 receive the feed signal from the L-band distribution and routing system 142 and demodulate the feed signal. The receiver may also provide decryption. The feed signal may be in an ATSC-compliant transport stream from terrestrial fiber or satellite sources. The feed signal may also be a DVD-compliant transport stream delivered via satellite or fiber. The signal may also include a digicipher-compliant transport stream, a JPEG 2000 transport stream or various proprietary formats from various content providers. The output of the receiver may be provided via an ASI or MPEG IP interface.

Should the content from the content provider be provided in a format that can be immediately used by the system, the receiver may be replaced with a pass-through connector such as a barrel connector.

The receive signal from the receiver 160 is provided to decoders 162. The decoders 162 decode the receive signal to provide decoded signals. The receive signal may still be compressed and, thus, the decoder may be used for decoding the live compressed video and audio content. The receive signal may be an ATSC-compliant transport stream, a DVD-compliant transport stream, a digicipher-compliant transport stream, a JPEG 2000 transport stream or various proprietary formats that may be delivered via ASI or MPEG/IP. The output of the decoder is a baseband signal that may be in a variety of formats such as a high definition serial digital interface (HD-SDI) format. The decoders 162 may also include a general purpose interface used to convey add trigger events via contact closures. The input may be delivered directly from an upstream receiver, a conversion box that converts dual-tone multi-frequency tones from the upstream receiver into the general purpose interface. The audio format may carry various types of audio streams including Dolby digital, Dolby E or PCM audio. More than one type of audio stream may be included for a signal. The house signal may also include society of cable telecommunication engineers standard 104 and 35 messages. The house signal may also include closed captioning and vertical interval time code (VITC). It is possible that the decoder may not be required if the content provided from the live content sources in the proper format. Therefore, the decoder is an optional piece of equipment.

For the occasional channels 154, the output of the decoders 162 may be provided to an occasional HD-SDI routing system 164. An occasional channel is a live turnaround channel that only exists long enough to carry one or more events, typically sporting events such as those in the NFL or NBA. The type of receiver formatting or authorizations may vary depending on the type of event. Only a small number of receivers are used for these types of events. The routing system 164 allows a proper allocation of downstream equipment in proportion to the number of active broadcast channels rather than the number of content providers.

An insertion module 166 is illustrated as a separate module for the insertion of identification signals into the received signals. The insertion module 166 may also be incorporated into the receiver 160 or the decoder 162. The insertion module 166 may be used to insert a network name, call letters, a channel name or other source identifiers into the digital stream. Insertion may take place in various places including before the signal is received at a receiver. This may be performed at a content provider facility. For the occasional channels, the output of the routing system is provided to the service access processing system (SAPS) 116. The output of the decoders 162 in the ingest channels 150, the turnaround channels 152, and the CONUS local collection facility channels 156 are each provided to the SAPS 116.

The SAPS 116 provide baseband processing which may include conversion to a house format and ad-insertion. The SAPS 116 receives a single HD-SDI signal from each decoder 162. It is possible that the decoder and the SAPS may be combined in one unit. The service access processing system 116 may extract and reinsert various audio streams, such as PCM, Dolby digital, or Dolby E audio. The SAPS 116 may also transcode the signals in the case where a different coding scheme is required. Various operational modes may also be incorporated into the SAPS 116 including frame synchronization, error concealment, and the use of variable incoming bit rates. The SAPS 116 may also support real time changes in the video format. The video format may, for example, be 1080p, 1080i, 720p, and 480p.

Server-based channels 170 may also be included in the system. Server-based channels 170 include a baseband video server 114 that receives content from the content repository 104.

The primary and back-up baseband video servers 114 of the server-based channels 170 may be coupled to a receiver transfer unit (RTU) 176. The primary and back-up service access processing system of the turnaround channels 152, the occasional channels 154, and the remote collection facility channels 156 may all be coupled to a receiver transfer unit 176. The receiver transfer unit 176 performs various functions including redundancy switching or selection for choosing between the primary and the back-up outputs of the baseband video server 114 or the service access processing system 116 and providing the chosen signal to an encoder 182. The receiver transfer units 176 may also route the signals for monitoring and redundancy to an HD-SDI monitoring system 186. The receiver transfer units 176 may provide an automatic redundancy mode in which the unit fails to a back-up input upon loss of a primary input signal. The RTU 176 may also be implemented so that a switch back from the back-up to the primary unit may not be automatically performed without manual intervention. The receiver transfer unit 176 may be a switch that is controlled by software or the like. In the case of a failure of one of the encoders 182, a routing system 186 may be used to route the signal through a back-up encoder 190.

The HD-SDI routing system 186 may provide a plurality of back-up encoders for the various channels.

The encoders 182 and the encoders 190 encode the video audio closed-captioned data VITC and SCTE 35 data associated within a single chain. The output of the encoder is a single program transport stream that is provided by way of an MPEG-IP interface. The single program transport stream (SPTS) is coupled to a local area network 130. The local area network 130 may include a plurality of router 192 that are used to route the single port transport streams to an uplink signal processing system 200. Several uplink signal processing systems 200 may be provided. The single program transport stream includes identification of the signal so that it may be properly routed to the proper uplink signal processing system. The uplink signal processing system 200 generates an output to an uplink RF system (URFS) 202. The uplink signal processing system 200 may also provide redundant pairs to increase the reliability of the output signal.

The uplink signal processing system 200 may include a multiplexing splicing system (MSS) 210, an advance transport processing system 212, and a modulator 214. Pairs of multiplexing splicing systems 210, advance transport processing systems 212, and modulators 214 may be provided for redundancy. The multiplexing splicing system 210 multiplexes the single program transport stream from the local area network 130 and may also provide insertion of advertising into the signal. Thus, the MSS acts as a multiplexing module and as an ad insertion module. Various numbers of single-program transport streams may be multiplexed. In one constructed embodiment, eight single program transport streams were multiplexed at each MSS 210. The ads to be inserted at the MSS 210 may be formatted in a particular format such as MPEG 4 format and have various types of digital including Dolby digital audio streams. The MSS may identify insertion points based on SCTE 35 in the incoming stream.

The advance transport processing system 212 converts the DVB-compliant transport stream from the MSS 210 into an advanced transport stream such as the DIRECTV A3 transport stream. The ATPS 212 may support either ASI or MPEG output interface for the broadcast path. Thus, the ATPS 212 acts as an encryption module. The ATPS 212 may accept data from the advanced broadcast controller 136 and the advanced program guide system 138. The ATPS 212 may also be coupled to a data broadcast system 226. The data from the ABC 136, the APGS 138, and the DBS 226 are multiplexed into the output transport stream. Thus, the ATPS 212 acts as a data encryption module. As will be described below, the ATPS may also be coupled to the advanced broadcast management system described below in FIG. 4. Error reporting to the advanced broadcast management system (300 in FIG. 4) may include transport level errors, video outages, audio outages, loss of connection from a redundancy controller or a data source, or a compression system controller.

The modulators 214 modulate the transport stream from the ATPS 212 and generate an RF signal at a frequency such as an L-band frequency.

An RF switch 216 is coupled to the primary modulator and back-up modulator 214. The RF switch provides one output signal to the uplink RF system 202.

Referring back to the front end of the ground segment 100, a CONUS local collection facility (CLCF) 226 may be used to collect live content represented by box 228 at a content-provider site or delivered to the CLCF 226 by way of a fiber. A plurality of encoders 230 may be used to encode the signals in a useable format by the system. The encoder signals may be provided to a back hall internet protocol network 232 and provided to a decoder 162 within the CLCF channels 156 or to a receiver 160 in the CLCF. As mentioned above, if the content is formatted in a usable format, the receiver 160 may not be required. Should the receiver function be required, a receiver may be used in the system.

Figure 4:
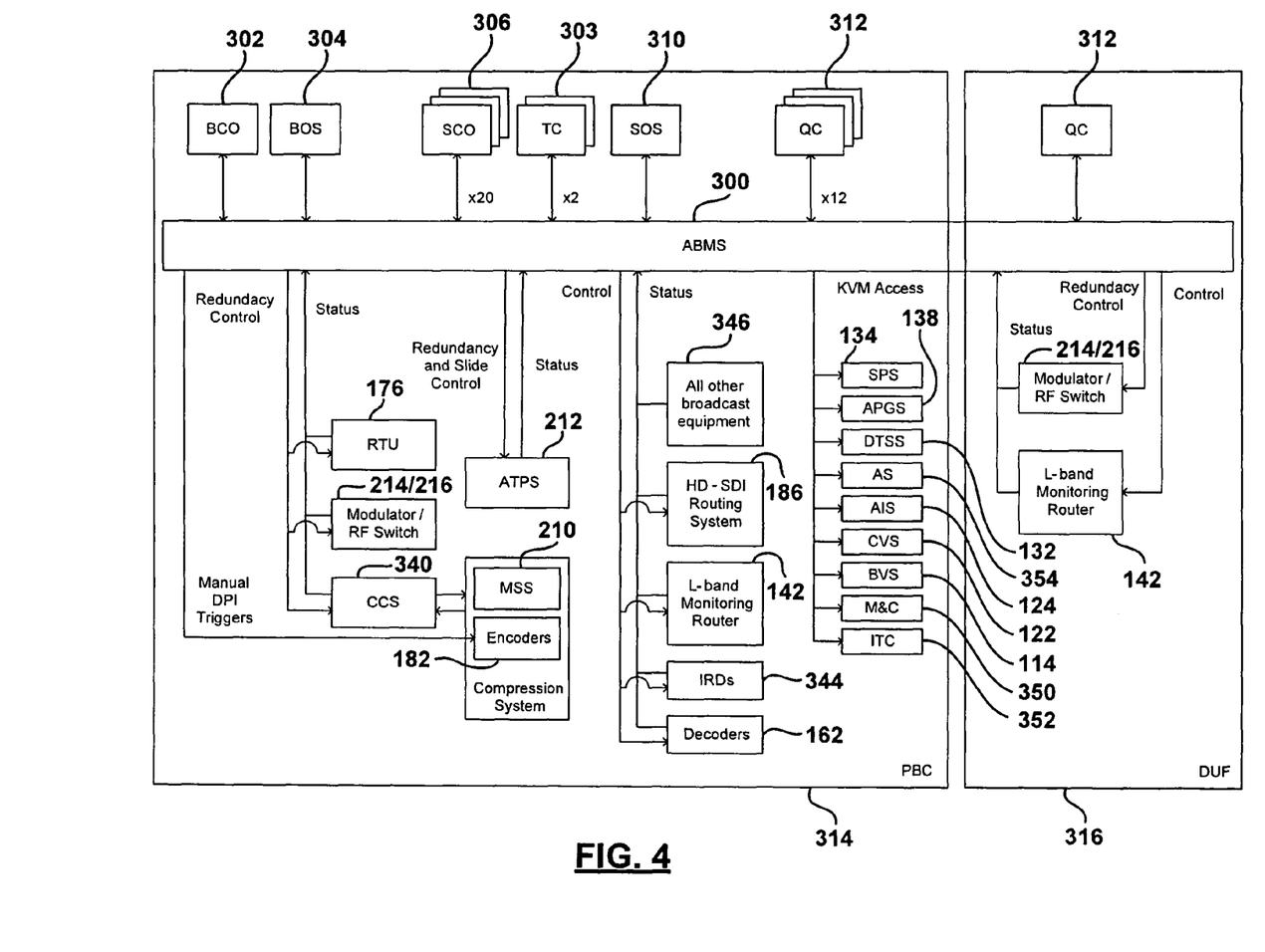
FIG. 4 is a block diagrammatic view of the control portion of the system of FIG. 3.

Referring now to FIG. 4, an advanced broadcast management system (ABMS) 300 is illustrated. The ABMS 300 monitors and controls the various functions of the ground segment 200. The ABMS 300 is coupled to a broadcast control operator (BCO) 302. The BCO 302 is the primary monitoring control point for various operations. A top-level view of the ground segment 200 may be provided to the broadcast control operator. A summary of the status of each channel may also be provided. The BCO may route channels to a various transponders to various monitors for tracking of ongoing problems.

The ABMS 300 may also be coupled to a broadcast operation supervisor station (BOS) 304. The broadcast operation supervisor station 304 provides additional monitoring control for operation supervisors in addition to those above described with respect to the BCO 302. Video monitors of any broadcast channel, as well as routes associated with critical monitoring points, may be provided to the BOS 304. Also, audio outputs may be selected for monitoring by BOS 304.

A sports central operator (SCO) 306 is utilized for manual ad-insertions typically during sporting events. The SCO 306 may be used to monitor any broadcast channel in the ground segment 200. Monitoring a video quality and audio quality may take place at the SCO 306.

A trigger central system 308 may also be coupled to the ABMS 300. The trigger central system provides a primary monitoring point for sports-central related activities.

The sports operations supervisor station (SOS) 310 provides an additional monitoring point for the sports central-related activities. The SOS 310 may monitor any broadcast channel in the ground segment 200.

Quality control stations 312 may also be coupled to the ABMS 300. The quality control stations may provide primary monitoring and control point for various technical services and support maintenance and troubleshooting activity. The ABMS may include quality control, both in the primary broadcasting center 314 and the diverse uplink facility 316.

The ABMS 300 may also be coupled to a compression control system (CCS) 340. The compression control system 340 manages the encoder and MSS devices illustrated in FIG. 3. The CCS 340 may be responsible for the control and configuration management of the encoder and MSS equipment. Redundancies of the encoder may also be controlled by the CCS 340. An external interface may be provided at the CCS for encoder and MSS health status monitoring and redundancy control. The total video bandwidth may also be controlled by the CCS through an external interface. The ABMS may also be coupled to the various equipment illustrated in FIG. 3, such as the RTU 176, the modulator/RF switch 214/216, the ATPS 212, the L band monitoring router 142, decoders 162, the SPS 134, the APGS 138, the AIS 124, the CVS 122, the BVS 114, and the modulator/RF switch 214/216 of a diverse site.

The ABMS may also be coupled to an integrated receiver decoder 344 that is used for receiving the signals from the satellite to monitor the quality thereof. All other broadcast equipment 346 may also be coupled to the ABMS for control and monitoring purposes.

As mentioned above, the ABMS 300 may include monitoring control functions 350 and may also monitor the Integrated-Receiver-Decoder (IRD) Tuning Control (ITC) 352.

ABMS 300 may also be coupled to the ad insertion server 354, which is responsible for management of ad content and ad content delivery to the MSS 210.

Figure 5:
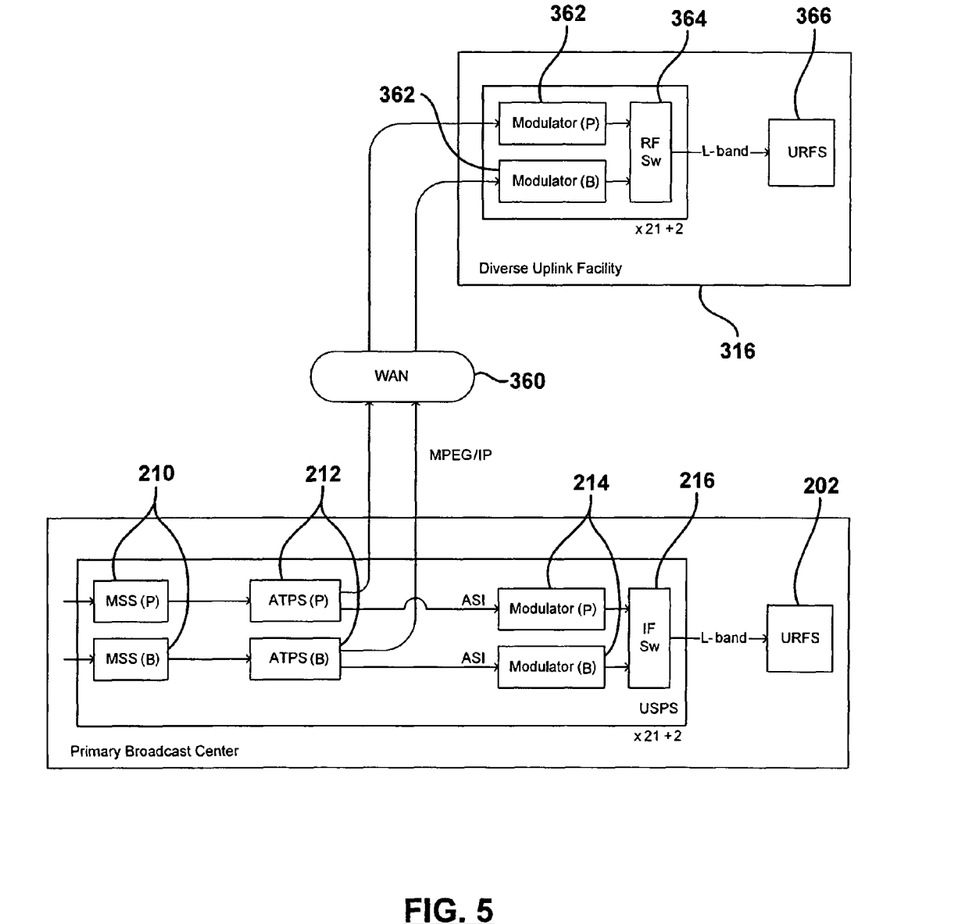
FIG. 5 is a schematic view of a primary and diverse site.

Referring now to FIG. 5, the primary broadcast center 314 and diverse uplink facility 316 are illustrated in further detail. The circuitry within the primary broadcast center 314 is identical to that illustrated above in FIG. 3 except that the ATPS 212 may be coupled to a wide area network 360. The wide area network 360 provides signals from the primary and back-up ATPS to a diverse uplink facility modulator 362. Both a primary and back-up uplink modulator 362 may be provided. An RF switch 364 may also be provided. The RF switch 364 may be a similar configuration to switch 216 described above. Likewise, the uplink RF system 366 may also provide a similar function to that described above with respect to uplink RF system 202.

Figure 6:
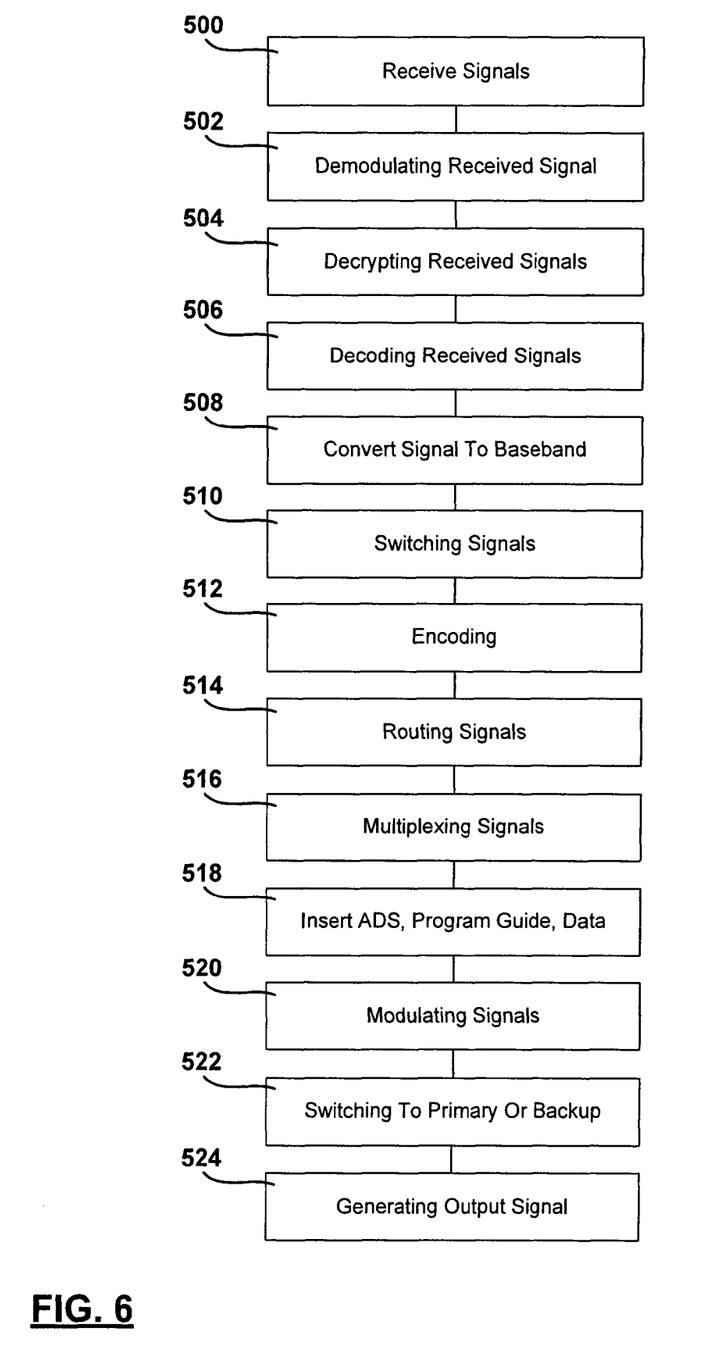
FIG. 6 is a flowchart illustrating switching logic for a primary and diverse site.

Referring now to FIG. 6, a summary of a method of operating the system of FIG. 3 is illustrated. In step 500, various signals are received. The signals that are received may be file-based content, tape-based content, or live content delivered in various manners including tapes, files, DVDs, satellite, or fibers.

In step 502, the receive signals may be demodulated if the signals are required. In step 504, the receive signals are decrypted, also as if required.

In step 506, the signals are decoded. The decoded signals may be in a high definition serial digital interface (HD-SDI) format. The decoded signals may be provided to a service access processing system or a baseband video system where they may continue to be processed. The service access processing system may convert the signal to baseband. In step 510, the primary or back-up signals that are converted to baseband may be selected or switched and provided to an encoder. Also, the switching unit may also provide this signal to a routing system for monitoring and redundancy check. In step 512, the switched signals are encoded and in step 514 the signals are routed through a local area network to a multiplexer. The multiplexer multiplexes the signal in step 516. Several signals may be multiplexed together.

In step 518, the advanced transport processing system may insert various conditional access program guide information or other advertising or other data into the system in step 516. After step 518, the signals are modulated in step 520. Preferably, as mentioned above, a primary and back-up multiplexing system, advance transport processing system and a modulator are provided. In step 522, switching to the primary or back-up signal is performed in a switch. The output of the switch is used to generate an output signal such as an uplink signal at an uplink RF system.

Figure 7:
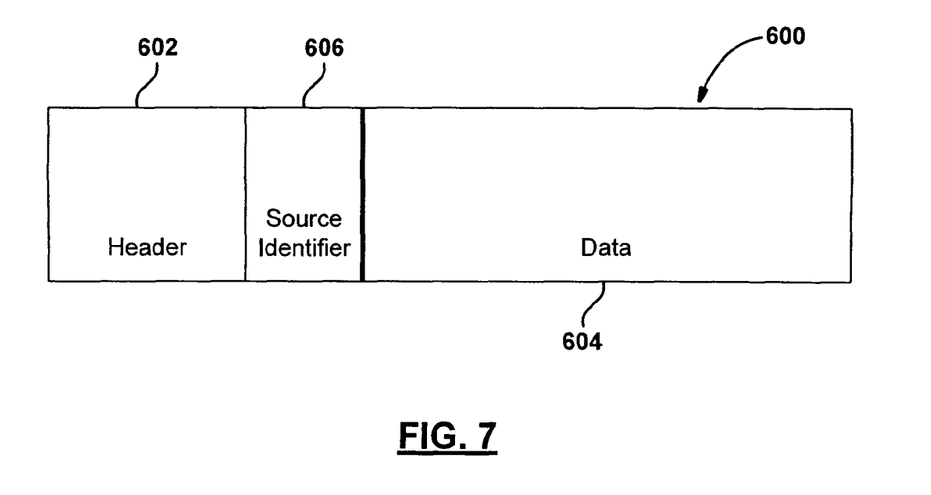
FIG. 7 is a diagrammatic view of a communication signal having a source identifier formed according to the present disclosure.

Referring now to FIG. 7, it may be possible that the LAN 130 and the routers 192 associated therewith may misroute a particular transport stream. The misrouting may be caused from the router itself or from unintentional operator intervention.

A portion of the single program transport stream is illustrated as a packet 600. The packet 600 may include a header portion 602 and a data portion 604. The header portion may also include a source identifier 606. The source identifier may be inserted at various locations in the system including at the receiver 160, at the decoder 162, or at the service access processing system 116. The source identifier may be various types of identification including call letters, a channel name, a network name, or the like. The signal may be a baseband signal into which the source identifier is inserted.

Figure 8:
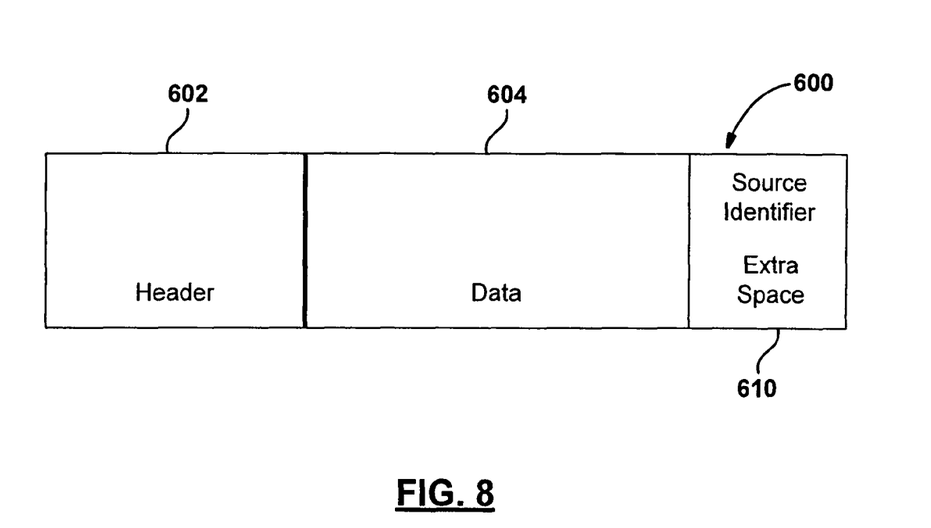
FIG. 8 is a diagrammatic view of an alternative communication signal having a source identifier.

Referring now to FIG. 8, the source identifier may also be provided in the data portion 604. In some signals the complete data portion may not entirely be used.

The source identifier may include the vertical ancillary part of a baseband signal.

Figure 9:
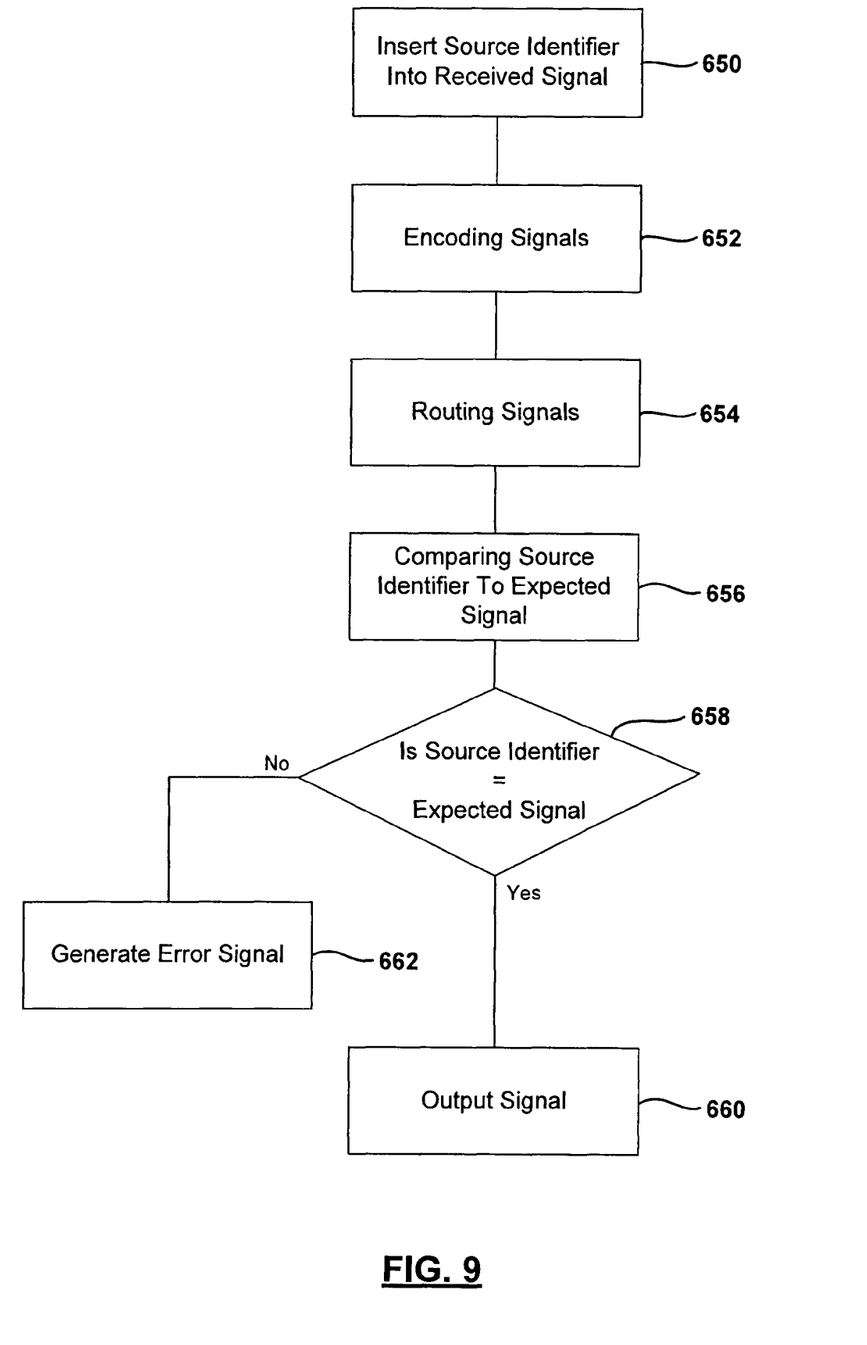
FIG. 9 is a flowchart of a method for uplinking a signal having a source identifier.

Referring now to FIG. 9, a method for processing the signals is identified. In step 650, the source identifier is inserted into the receive signal. As mentioned above, the source identifier may be input into the vertical ancillary portion of the signal (VANC). The source identifier may be inserted into the signal prior to receiving at the content provider or may be inserted at various portions of the system. In one example, the source identifier information may be input to the signal at the decoder 162. In step 652, the signals may be processed through a SAPS 116 and an RTU 176. Thereafter, the signals may be encoded in step 652. The signals are then routed to a particular multiplexing system corresponding to a transponder. In step 656, the source identifier is compared to the expected signal. This may be performed at the advanced transport processing system 212. In step 658, if the source identifier is equal to the expected signal, step 660 generates the uplink signal from the receive signal. In step 658, if the source identifier is not equal to the expected signal, step 662 is provided in which an error signal is generated. The error signal may be a blank signal that is broadcast, an error signal such as "we are having technical difficulties" or the like. This prevents a wrong channel from being broadcast over the system.

Those skilled in the art can now appreciate from the foregoing description that the broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification and the following claims.

What is claimed is:

1. A method of forming an output signal comprising:
receiving a plurality of signals having a first format;
encoding the signals to generate a plurality of transport streams, wherein each of the plurality of transport streams comprises audio data and video data;
after encoding, routing the plurality of transport streams from respective channels of receivers through a local area network to a multiplexer, wherein the multiplexer combines the plurality of transport streams to form a multiplexed signal;
communicating the multiplexed signal to a transport processing system;
multiplexing conditional access data, program guide data and the multiplexed signal at the transport processing system to form a combined signal;
modulating the combined signal to form a modulated signal; and
forming the output signal from the modulated signal.

2. A method as recited in claim 1 wherein prior to modulating, converting the combined signal to a second format at the transport processing system.

3. A method as recited in claim 1 further comprising inserting advertising data into the multiplexed signal at the transport processing system.

4. A method as recited in claim 1 further comprising inserting advertising data into the multiplexed signal at the multiplexer.

5. A method as recited in claim 1 further comprising:
decoding and converting the plurality of signals to baseband signals;
inserting advertising data in the baseband signals prior to encoding; and communicating the advertising data through the local area network from respective channels.

6. A method as recited in claim 1 wherein the plurality of signals are received from a satellite.

7. A method as recited in claim 1 wherein the plurality of signals are received via an optical fiber cable.

8. A method as recited in claim 1 wherein the plurality of signals are received from a local collection facility.

9. A method as recited in claim 1 further comprising:
decoding and converting the plurality of signals to baseband signals; and
providing content to at least one of a baseband video server and a service access processing system from a content repository,
wherein the baseband signals are processed via the baseband video server based on the content received from the content repository.

10. A method as recited in claim 9 further comprising providing content to the content repository from a file based content source.

11. A method as recited in claim 9 further comprising providing content to the content repository from a tape-based content source.

12. A method as recited in claim 1 further comprising:
decoding and converting the plurality of signals to baseband signals; and
demodulating the plurality of signals subsequent to receiving the plurality of signals and prior to converting the plurality of signals to the baseband signals.

13. A method as recited in claim 12 further comprising decrypting the plurality of signals subsequent to receiving the plurality of signals and prior to converting the plurality of signals to the baseband signals.

14. A method as recited in claim 1 further comprising converting the first format to a second format prior to encoding, wherein:
the plurality of signals when in the first format include at least one of an advanced television systems committee compliant transport stream, a digital video disc compliant transport stream, a digicipher compliant transport stream, and a JPEG transport stream; and
the second format is a high definition serial digital interface format.

15. A method as recited in claim 1 wherein:
the plurality of signals are routed at a primary site;
the combined signal is modulated to form the modulated signal at a diverse site; and
the diverse site is separate and remotely located from the primary site.

16. A method as recited in claim 15 wherein forming the output signal comprises transmitting an uplink signal from the diverse site.

17. A method as recited in claim 16 wherein the uplink signal comprises a Ka band uplink signal.

18. A method as recited in claim 16 wherein the uplink signal comprises a digital television signal.

19. A method as recited in claim 16 wherein the uplink comprises a high-definition digital television signal.

20. An apparatus comprising:
receivers receiving a plurality of signals having a first format;
a routing system routing the plurality of signals to respective channels of the receivers;
decoders decoding the plurality of signals and outputting baseband signals;
encoders generating a plurality of transport streams based on the baseband signals, wherein each of the plurality of transport streams comprises audio data and video data;
a multiplexer;
a local area network routing the plurality of transport streams from the respective channels to the multiplexer, wherein the multiplexer combines the plurality of transport streams to form a multiplexed signal;
a transport processing system in communication with the multiplexer and multiplexing conditional access data, program guide data and the multiplexed signal to form a combined signal; and
a modulator modulating the combined signal to form a modulated signal.

21. An apparatus as recited in claim 20 wherein the transport processing system converts the combined signal to a second format.

22. An apparatus as recited in claim 20 wherein the transport processing system inserts advertising data into the combined signal.

23. An apparatus as recited in claim 20 wherein the multiplexer inserts advertising data into the combined signal.

24. An apparatus as recited in claim 20 further comprising at least one of baseband video servers and service access processing systems receiving content from a content repository and processing the baseband signals based on the content received from the content repository.

25. An apparatus as recited in claim 20 further comprising demodulators demodulating the plurality of signals subsequent to the receivers receiving the plurality of signals and prior to the decoders generating the baseband signals.

26. An apparatus as recited in claim 25 wherein the receivers decrypt the plurality of signals.

27. An apparatus as recited in claim 20 further comprising a service processing system converting the first format to a second format prior to encoding, wherein:
the plurality of signals when in the first format include at least one of an advanced television systems committee compliant transport stream, a digital video disc compliant transport stream, a digicipher compliant transport stream, and a JPEG transport stream; and
the second format is a high definition serial digital interface format.

28. An apparatus as recited in claim 20 wherein:
a primary site includes the routing system;
a diverse site includes the modulator; and
the diverse site is separate and remotely located from the primary site.

29. An apparatus as recited in claim 28 wherein the diverse site transmits an uplink signal from the diverse site when the modulator generates the modulated signal.

30. An apparatus as recited in claim 29 wherein the uplink signal comprises a Ka band uplink signal.

31. An apparatus as recited in claim 29 wherein the uplink signal comprises a digital television signal.

32. An apparatus as recited in claim 29 wherein the uplink comprises a high-definition digital television signal.

33. The method of claim 1 further comprising:
routing the plurality of signals to respective channels of the receivers;
decoding and converting the plurality of signals to baseband signals; and
providing the baseband signals to encoders.

34. The apparatus of claim 20 wherein the plurality of signals are received on ingest channels, server based channels, turnaround channels, occasional channels, and CLCF channels.

35. The apparatus of claim 20 further comprising:
a broadcast server generating the conditional access data; and
a program guide system generating the program guide data.

36. The apparatus of claim 35 further comprising a scheduled pad server receiving program associated data,
wherein the broadcast server generates the conditional access data based on an output of the scheduled pad server.

37. The apparatus of claim 36 further comprising a traffic scheduling system configured to schedule content and generate broadcast schedules, wherein:
the program guide system generates the program guide data based on the broadcast schedules; and
the scheduled pad server generates the output based on the broadcast schedules.

38. The apparatus of claim 37 further comprising at least one of baseband video servers and service access processing systems processing the baseband signals prior to being encoded by the encoders, wherein the at least one of baseband video servers and service access processing systems process the baseband signals based on the broadcast schedules.

39. The apparatus of claim 38 further comprising an automation system generating control schedules based on the broadcast schedules,
wherein the at least one of baseband video servers and service access processing systems process the baseband signals based on the control schedules.

40. The apparatus of claim 39 further comprising an ad server generating an advertisement signal based on an output of the automation system,
wherein the advertisement signal is transmitted to at least one of the multiplexer and the transport processing system via the local area network.

41. The apparatus of claim 20 further comprising:
processing servers processing the baseband signals;
receiver transfer units receiving outputs of the processing servers and generating first signals and second signals, wherein the encoders encode the first signals to generate encoded signals, and wherein the encoded signals are routed to the multiplexer via the local area network;
a high definition serial digital interface routing system receiving the second signals; and
an encoder encoding an output of the high definition serial digital interface routing system and generating an encoded output signal, wherein the encoded output signal is transmitted via the local area network to the multiplexer.

42. The apparatus of claim 41 wherein the high definition serial digital interface routing system is configured to facilitate allocation of downstream equipment in proportion to a number of active broadcast channels and not based on a number of channel providers.

43. The apparatus of claim 20 further comprising a data broadcast system, wherein the transport processing system multiplexes an output of the data broadcast system with the conditional access data, the program guide data and the multiplexed signal to generate the combined signal.

* * * * *